United States Patent
Clabaugh

(10) Patent No.: US 8,179,272 B2
(45) Date of Patent: May 15, 2012

(54) TANK FLUID LEVEL MONITOR AND REFILL INDICATOR

(76) Inventor: Chris Clabaugh, Port Clinton, OH (US)

(*) Notice: Subject to any disclaimer, the term of this patent is extended or adjusted under 35 U.S.C. 154(b) by 784 days.

(21) Appl. No.: 12/204,305

(22) Filed: Sep. 4, 2008

(65) Prior Publication Data

US 2009/0058666 A1 Mar. 5, 2009

Related U.S. Application Data

(60) Provisional application No. 60/970,151, filed on Sep. 5, 2007.

(51) Int. Cl.
*G08B 21/00* (2006.01)
(52) U.S. Cl. .................................. 340/618; 340/815.69
(58) Field of Classification Search ........................ None
See application file for complete search history.

(56) References Cited

U.S. PATENT DOCUMENTS

| | | | | |
|---|---|---|---|---|
| 3,995,169 A * | 11/1976 | Oddon | ........................ | 250/577 |
| 4,074,244 A * | 2/1978 | Balderson | ..................... | 340/618 |
| 4,536,756 A | 8/1985 | DePasquale et al. | | |
| 4,688,028 A | 8/1987 | Conn | | |
| 5,435,031 A * | 7/1995 | Minami et al. | .................. | 15/1.7 |
| 5,708,424 A * | 1/1998 | Orlando et al. | ......... | 340/870.08 |
| 6,108,614 A * | 8/2000 | Lincoln et al. | ................ | 702/183 |
| 6,333,512 B1 | 12/2001 | Wirthlin | | |
| 6,822,565 B2 | 11/2004 | Thomas et al. | | |
| 7,079,037 B2 * | 7/2006 | Ross et al. | ..................... | 340/618 |
| 7,109,512 B2 | 9/2006 | Wirthlin | | |
| 7,161,165 B2 | 1/2007 | Wirthlin | | |
| 7,270,485 B1 * | 9/2007 | Robinson et al. | ............... | 385/55 |
| 7,441,569 B2 * | 10/2008 | Lease | ............... | 141/95 |
| 2004/0079152 A1 * | 4/2004 | Sorenson et al. | ............... | 73/313 |
| 2004/0212468 A1 | 10/2004 | Ross, Jr. | | |
| 2006/0144140 A1 * | 7/2006 | Hache | ............... | 73/295 |

OTHER PUBLICATIONS

Rochester Gauges, Inc.; "Rochester Remote Ready Dial & Reed Switch Module" Technical Data Sheet; Dallas, Texas; http://www.rochestergauges.com.

* cited by examiner

*Primary Examiner* — Daniel Wu
*Assistant Examiner* — Brian Wilson
(74) *Attorney, Agent, or Firm* — Rankin, Hill & Clark LLP

(57) ABSTRACT

A device and system for monitoring a fluid level within a tank and for indicating when the fluid level within the tank has dropped below a predetermined minimum level. The device includes a strobe light, which is switched on when a sensor determines that the fluid level within the tank has dropped below a predetermined level. The flashing strobe light can be viewed during the day and at night from any viewing angle, and can thereby alert an observer that the tank needs to be filled before the tank becomes empty.

11 Claims, 3 Drawing Sheets

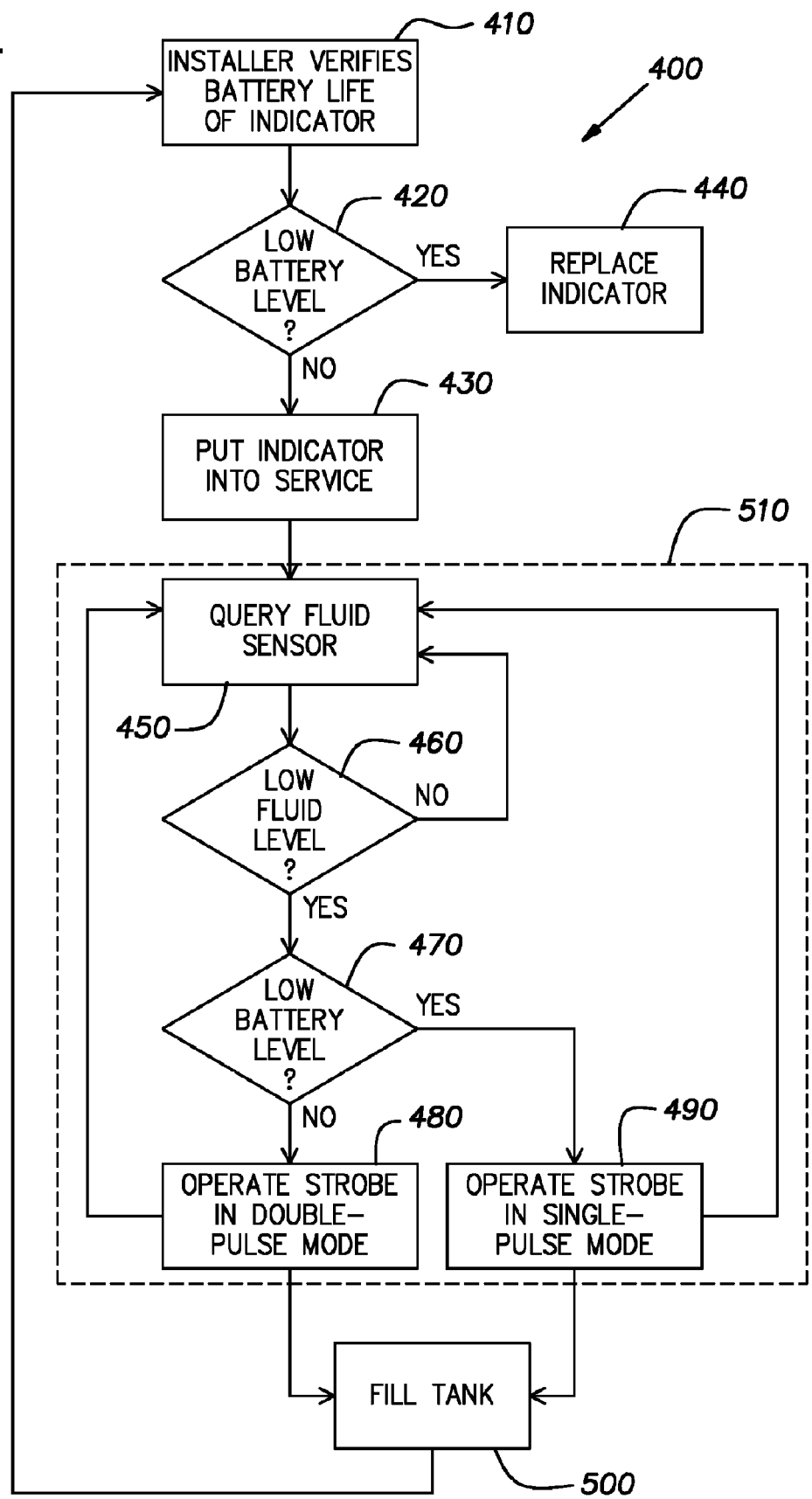

TANK FLUID LEVEL MONITOR AND REFILL INDICATOR

BACKGROUND OF INVENTION

1. Field of Invention

The present invention is directed to a device and method for monitoring a fluid level within a tank and for indicating when the fluid level within the tank has dropped below a predetermined minimum level.

2. Description of Related Art

Ross, Jr. et al., U.S. Pat. No. 7,079,037 B2, discloses an indicator for displaying either a low liquid level or a satisfactory liquid level condition existing within a tank. The indicator according to Ross, Jr. et al. includes a sensor for detecting the liquid level conditions, a photodetector for detecting an ambient dark condition, a pair of indicator lights for indicating either the low liquid level or satisfactory liquid level conditions, and electrical circuitry operable to illuminate one of the indicator lights upon detection of the ambient dark condition by the photodetector and detection of either the low liquid level condition or satisfactory liquid level condition by the sensor. The indicator according to Ross, Jr. et al. can be used in connection with outdoor LPG and heating oil tank applications.

As noted, one of the features of the indicator according to Ross, Jr. et al. is that the indicator lights are only illuminated when the photodetector determines that an ambient dark condition exists. Thus, an observer must be present during an ambient dark condition in order to observe the indicator lights. The indicator lights are not illuminated during daylight hours.

Another feature of the indicator according to Ross, Jr. et al. is that the indicator lights are mounted on one side of or are recessed within a display portion of the indicator. Thus, the observer must observe the indicator lights from a limited viewing angle in which the indicator lights can be seen.

BRIEF SUMMARY OF THE INVENTION

The present invention is directed to a device and method for monitoring a fluid level within a tank and for indicating when the fluid level within the tank has dropped below a predetermined minimum level. The device includes a strobe light, which flashes when a sensor determines that the fluid level in the tank has dropped below a predetermined level. The flashing strobe light can be viewed during the day and at night from any viewing angle and thus is able to alert an observer that the tank needs to be filled before the tank becomes empty.

The present invention also provides a method for monitoring a fluid level within a tank and for indicating when the fluid level within the tank has dropped below a predetermined minimum level. The method of the invention utilizes the device according to the invention.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 4 is a flow diagram illustrating the method according to the invention.

It is noted that the drawings are intended to depict only typical embodiments of the invention and therefore should not be considered as limiting the scope thereof. It is further noted that the drawings may not be necessarily to scale. The invention will now be described in greater detail with reference to the accompanying drawings.

DETAILED DESCRIPTION OF THE INVENTION

Figure 1:
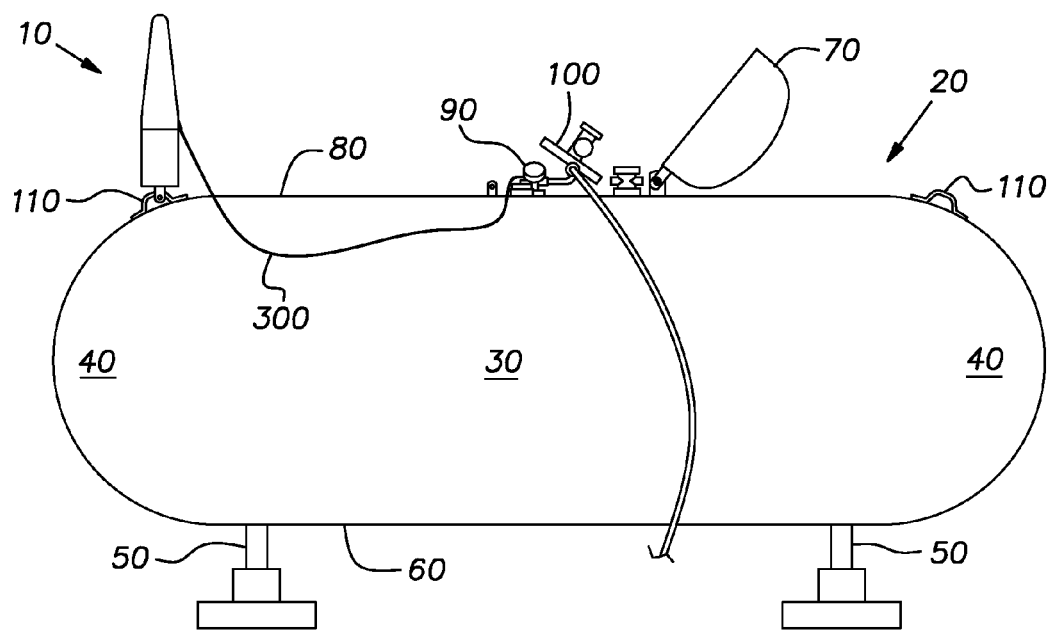
FIG. 1 is a front elevation view of a tank fluid level monitor and refill indicator mounted on an exemplary tank in accordance with the invention.

Referring to the drawings and in particular to FIG. 1, an indicator 10 for monitoring a fluid level within a tank 20 and for indicating when the fluid level within the tank has dropped below a predetermined minimum level is illustrated. The exemplary tank 20 shown in FIG. 1 includes a generally tubular tank portion 30 that is connected to a pair of generally semi-spherical opposing end portions 40 in a hermetically sealed arrangement. Feet or legs 50 are provided at the bottom 60 of the tank for supporting the tank 20, while a cover 70 is hingedly connected to the top 80 of the tank to alternatively protect and expose various tank components, such as a gauge head assembly 90, valves 100 and other well-known tank components. The indicator 10 of the present invention is particularly advantageous when used in conjunction with outdoor LPG or other fuel tanks. However, it will be understood that other tank types and/or shapes can be used.

Although the indicator 10 can be mounted to the tank 20 at any position or orientation using any means (e.g., magnets, adhesives), it is preferred that the indicator 10 be mounted generally at the top 80 of the tank 20 to maximize its visibility using one or more mechanical fasteners. Ideally, the indicator 10 is secured to one of the lifting lugs 110 of the tank 20, as shown in FIG. 1.

Figure 2:
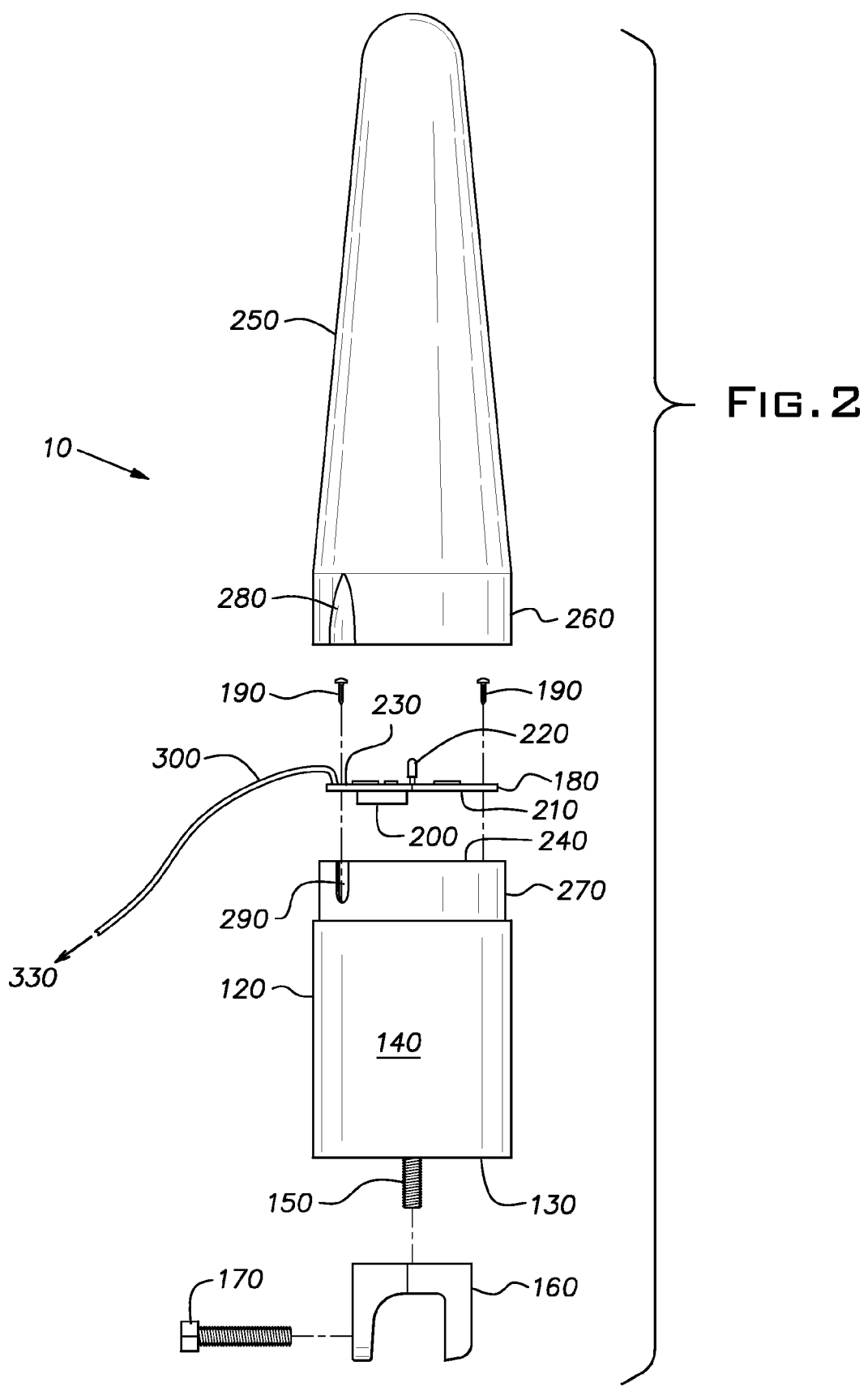
FIG. 2 is an exploded front elevation view of the tank fluid level monitor and refill indicator shown in FIG. 1.

With reference to FIG. 2, the indicator 10 preferably includes a hollow lower housing 120 comprising a base portion 130 and an upwardly extending sidewall portion 140. In the preferred embodiment of the invention, the base portion 130 is disk-shaped and the upwardly extending sidewall portion 140 is cylindrical. The base portion 130 and the upwardly extending sidewall portion 140 are preferably integrally formed, but can be formed of two or more separate parts that are joined together if desired. It will further be appreciated that different shapes can be employed if desired.

In the preferred embodiment of the invention, a threaded stud 150 extends perpendicularly from the base portion 130. The threaded stud 150 is adapted to thread into a mounting bracket 160, which is adapted to be secured to the lifting lug 110 of a tank 20 using a bolt 170 or other suitable fastener. It will be appreciated that other means could be employed to secure the indicator 10 to the tank 20 (e.g., straps, adhesives, magnets etc.).

A circuit board 180 is mounted within the hollow lower housing 120, preferably using one or more screws 190. A battery 200 is mounted to the circuit board 180, preferably on the bottom side 210 thereof. A 3.6V 2.4 Ah lithium battery is presently most preferred for use in the invention. In the preferred embodiment of the invention, the battery 200 is hardwired to the circuit board 180.

A high-intensity LED type strobe light 220 is mounted to a top side 230 of the circuit board 180. A suitable high-intensity LED type strobe light 220, which produces high-intensity red strobe light, is available from Optek Technology as Part No. OVFSRAC8. The circuit board 180 is preferably mounted within the hollow lower housing 120 such that the high-intensity LED type strobe light 220 is disposed at or near the top open end 240 of the hollow lower housing 120.

A lens 250, which is preferably conical in shape, is connected to the hollow lower housing 120 to seal the circuit board 180 there within. Preferably, the lens 250 includes a lower portion 260, which is adapted to slide over an upper portion 270 of the lower housing 120. A bulge 280 is preferably formed in the lower portion 260 of the lens, and a channel 290 is preferably formed in the upper portion 270 of the lower housing 120 to permit a cable 300 that is electrically connected to the circuitry 310 formed on the top side 230 of the circuit board 180 to pass from the hollow interior of the indicator 10 to the outside. Preferably, a silicone caulking/adhesive is used to form a permanent, air-tight and water-tight seal between the lens 250 and the lower housing 120, including where the cable 300 passes through the gap formed between the lens 250 and lower housing 120 via the bulge 280 and channel 290. In the preferred embodiment of the invention, the top of the lens 250 is at least about 12" above the top 80 of the tank 20 when the indicator 10 is installed, and thus is adapted to remain visible notwithstanding heavy accumulations of snow.

The lower housing 120 and the lens 250 are both preferably formed of weather resistant injection-molded plastic. The lens 250 is preferably semi-transparent, and may be colored if desired. The lower housing 120 may be semi-opaque. Light emitted from the strobe light 220 passes through the lens portion 250 in such a manner as to be viewable by an observer from any viewing angle (i.e. 360°) and at great distance (e.g., more than 200 yards). In addition, the light emitted by the strobe light 220 is of a sufficient intensity that it may draw attention to the tank 20 and be observed during daylight hours as well as at night.

The cable 300 is connected at one end to the circuit board 180 of the indicator 10, and at the other end to a sensor 330 mounted to the tank 20. The sensor 330 provides an electrical signal to the circuit board 180 that is indicative of the fluid level in the tank 20. In the presently most preferred embodiment of the invention, the sensor 330 is a potted reed switch with a permanent magnet that keeps the reed switch in a normally closed state. The magnet couples with the gauge head assembly 90 to switch between open and closed positions depending on the rotational position of a magnetically driven pointer of the gauge dial. The magnetically driven pointer rotates in response to a change in fluid level within the tank 20 in a well-known manner. A suitable gauge and switch combination is the Rochester Remote Ready Dial (R³D) and Reed Switch Module, which is available from Rochester Gauges, Inc. of Dallas, Tex.

The Rochester Remote Ready Dial (R³D) device includes a magnetic pointer that rotates between empty and full positions in response to float movement inside a tank. The Reed Switch snap-fits into a recess in a lens of the Rochester Remote Ready Dial (R³D) and can be adjusted to switch at a predetermined low liquid level. Preferably, the reed switch is in a normally closed state and opens when the magnetic pointer rotates to a position where its magnetic field opposes and offsets the magnetic field of the magnet in the proximity sensor, thereby causing the reed switch to open. It will be understood that the pointer need not necessarily be aligned with the proximity switch in order to cause the switching action. The particular switch point can be adjusted by providing the pointer with a predetermined magnetic strength and/or by providing the reed switch with a particular magnetic sensitivity. It will be understood that the reed switch can alternatively be of the normally open type that closes in response to pointer position. It will be further understood that the position sensor can be embodied as an optical switch, a mechanical contact switch, and so on. Alternatively, the position sensor may be embodied as a magnetic pick-up device, such as a hall-effect sensor, to monitor the relative magnetic field as the pointer moves toward or away from the sensor. A particularly sensed field strength can then be used as an indication of low liquid level.

Figure 3:
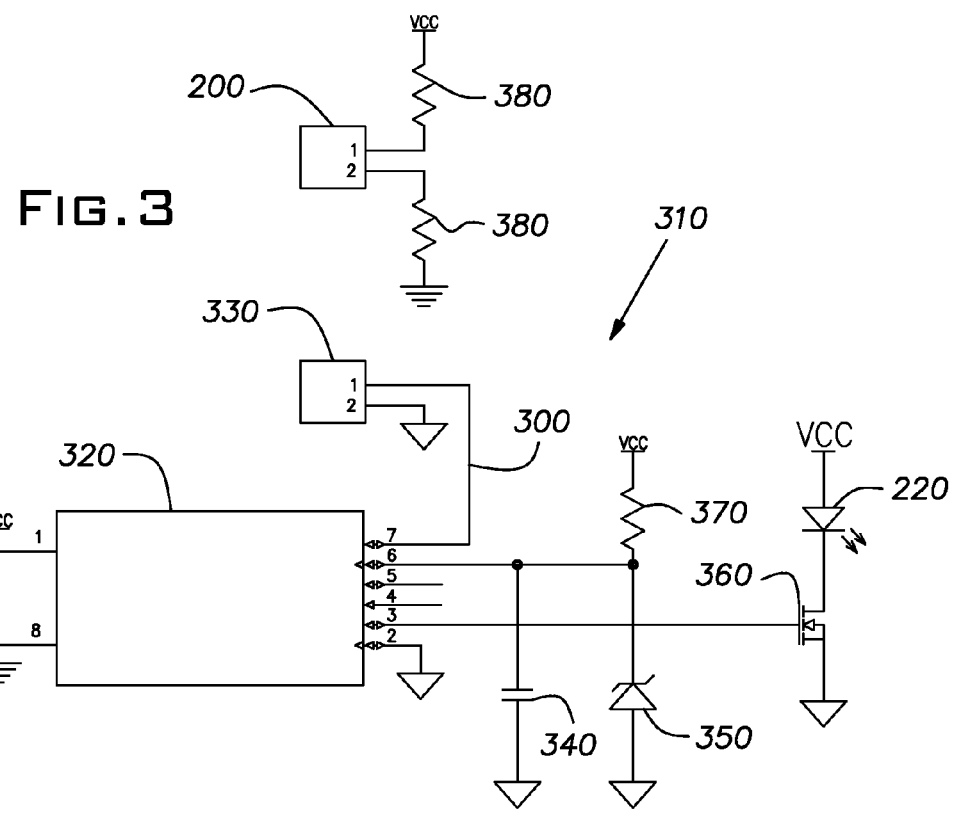
FIG. 3 is an electrical schematic for a tank fluid level monitor and refill indicator in accordance with the present invention.

FIG. 3 illustrates the electrical circuitry 310 formed on or electrically connected to the circuit board 180. The electrical circuitry 310 includes a microcontroller 320, which is electrically connected to the high-intensity LED type strobe light 220, to the battery 200 and to the sensor 330 (via cable 300). A suitable microcontroller is available from Microchip Technology Inc. of Chandler, Ariz., as part number PIC12F683. The electrical circuitry 310 also preferably comprises a 0.1 µF ceramic chip capacitor 340, a 2.048V reference diode 350, an n-channel MOSFET transistor 360, a 4.7 k 5% resistor 370 and a pair of 4.7Ω resistors 380. It will be understood that other processors, such as different types of microcontrollers, microprocessors, logic components, analog circuitry, and so on, may alternatively be used. In the preferred embodiment, the cable 300 and the battery 200 are preferably hardwired to the circuit board 180.

The microcontroller 320 is programmed to query the sensor 330 every 10 to 15 seconds to ascertain whether the fluid level within the tank 20 has dropped below a predetermined minimum. The battery 200 includes sufficient energy to permit the microcontroller 320 to query the sensor 330 in this manner for several years. When the microcontroller 320 determines that the fluid level within the tank 20 has dropped below a predetermined minimum, the microcontroller 320 sends a signal to the high-intensity LED type strobe light 220 to flash two times in relatively rapid succession (i.e., double-pulse mode) every 30 seconds or so until the tank is refilled (i.e., until the fluid level within the tank exceeds the predetermined minimum). As noted above, in the preferred embodiment of the invention the sensor 330 is a reed switch, and the microcontroller 320 communicates with the reed switch via the cable 300. The reed switch remains closed until such time as the fluid level within the tank 20 drops below a predetermined minimum level, which is preferably set at about 20% of the fill capacity of the tank 20. When the fluid level within the tank reaches the predetermined minimum, the reed switch opens, and the microcontroller 320 then signals the high-intensity LED type strobe light 220 to flash two times in relatively rapid succession every 30 seconds.

The microcontroller also continuously monitors the amount of energy remaining in the battery 200 (i.e., battery life). Once the battery life is determined to have reached a predetermine minimum after it has determined that the fluid level within the tank 20 has dropped below the predetermined minimum, the microcontroller 320 signals the high-intensity LED type strobe light 220 to flash only once every 30 seconds or so (i.e., single-pulse mode), in order to extend the remaining battery life. Whether the indicator 10 is flashing in double-pulse mode or single-pulse mode, the tank 20 should be filled and the indicator 10 should be inspected. If the remaining battery life is sufficient, the indicator 10 can be returned to service. If the battery life is insufficient, the indicator 10 should be replaced with a new indicator 10.

In the preferred embodiment of the invention, the battery 200 in the indicator 10 is not intended to be replaced by the end user or the installer. On the contrary, it is intended that an indicator 10 having insufficient battery life to remain in service be replaced with a new indicator 10 having a fully charged battery 200. The indicator 10 having insufficient battery life to remain in service can be factory reconditioned and/or recycled. It will be appreciated, however, that it would be possible to configure the indicator 10 such that the battery 200 was not hardwired to the circuit board 180 and could be recharged or replaced, as needed and/or each time the tank is filled.

FIG. 4 is a flow chart 400 that shows steps of a method according to the invention. The method of the invention utilizes the device 10 previously described above.

In block 410, the installer verifies that the battery 200 is sufficiently charged to place or keep the indicator 10 in service. Before attaching the indicator 10 to the sensor 330 mounted to the tank 20, the installer connects the indicator 10 to a test sensor, which the installer carries with him for this purpose. The installer operates the test sensor such that it sends a test signal to the microcontroller 320 that would be indicative of fluid level in a tank 20 being above a predetermined minimum. Next, and as shown in block 420, the installer operates the test sensor such that it sends a test signal to the microcontroller 320 that would be indicative of fluid level in a tank 20 dropping below a predetermined minimum. The high-intensity LED type strobe light 220 should then begin flashing in double-pulse mode once every 30 seconds or so, which verifies that the battery 200 is sufficiently charged to be kept or placed into service as shown in block 430. If a single flash or no flash is detected, then the battery 200 has insufficient charge to allow the indicator 10 to be kept or placed into service and must be replaced, as shown in block 440.

Once it has been determined that the battery 200 in the indicator 10 is sufficiently charged to permit placement of the indicator 10 into service as shown in block 430 the installer disconnects the cable 300 from the test sensor and then connects the cable 300 to the sensor 330 mounted to the tank 20. The installer also connects the indicator 10 to a lifting lug 110 or other suitable structure in a highly visible area of the tank 20 using appropriate means.

In block 450, the microprocessor queries the sensor 330 every 10 to 15 seconds or so to determine whether the fluid level within the tank 20 has dropped below a predetermined minimum. Preferably, the predetermined minimum is about 20% of the fill capacity of the tank 20. This predetermined minimum provides sufficient time for an observer to observe that the high-intensity LED type strobe light 220 on the indicator 10 is flashing, to place an order to have the tank 20 refilled and to continue to use the fluid remaining in the tank 20 between the time the order is placed and the time the tank 20 is filled without completely emptying the tank 20. It will be appreciated that a different predetermined minimum could be selected in view of the tank size, consumption and/or other considerations.

In block 460, if a low fluid level condition is not detected, the microprocessor 320 queries the sensor 330 again about 10 to 15 seconds later. If, however, the microprocessor 320 determines from the signal received from the sensor 330 that the fluid level in the tank has dropped below the predetermined minimum, the microprocessor 320 then queries, as shown in block 470, whether the battery 200 has reached a preset low power threshold. If the battery 200 has more power than the preset low power threshold, then the strobe flashes in double-pulse mode, which is shown in block 480. If the battery 200 has reached the preset low power threshold, then the strobe flashes in single pulse mode, which is shown in block 490. In double-pulse mode, pairs of strobe flashes are executed close in time to each other, with the pairs of strobe flashes being separated by a delay that is longer than the delay between the strobe flashes in each pair. This delay is typically set at about 30 seconds. In single pulse mode, the strobe flashes are spaced apart and are discharged as single flashes. This reduces battery power consumption as compared to operating the strobe in double pulse mode. In either instance, the strobe light begins flashing immediately, regardless of ambient light conditions, which are never detected or considered. The flashing of the strobe light 220 draws attention to the indicator 10 at all times of the day or night, even at relatively large distances, and in all light conditions and from all viewing angles. In block 500, the tank 20 is refilled above the predetermined minimum.

The dashed box indicated by reference number 510 shows the software logic used in the method of the invention. This is a closed-loop software program in which the microprocessor 320 queries the fluid level within the tank every 10 to 15 seconds continuously, and once it has been determined that the fluid level within the tank has reached a predetermined minimum, the microprocessor 320 instructs the strobe to flash in either single-pulse or double-pulse mode every 30 seconds or so depending upon the power remaining in the battery 200. The software program continues to execute in this closed loop until the tank 20 is refilled or the life of the battery 200 is completely exhausted. All of the steps of the method that are shown outside the dashed box indicated by reference number 510 are performed by an installer.

Ideally, an observer's attention is drawn to the indicator 10 promptly after the strobe begins flashing in double-pulse mode and arrangements are made for the tank 20 to be refilled. During refilling operations, the installer determines whether the remaining battery life is sufficient to keep the indicator 10 in service. If there is sufficient battery life remaining, the indicator 10 is left in service. If not, then the old indicator 10 is removed from service and is replaced with a new indicator 10 having sufficient power to operate at least until the next time the tank 20 needs to be refilled.

It will be appreciated that in some instances, a tank 20 may be refilled before the fluid level in the tank has reached the predetermined minimum and thus before the indicator 10 has flashed. When this occurs, the installer should verify that the indicator 10 has sufficient power to remain in service when the tank is refilled, as indicated in block 410.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A device for monitoring a fluid level within a tank equipped with a sensor that provides electrical signals indicative of whether or not the fluid level within the tank has dropped below a predetermined minimum level, the device comprising:

a housing mounted to the tank;
a battery;
a strobe light;
a lens that cooperates with the housing to encase at least the strobe light, the lens having a top that is above a top of the tank such that light emitted from the strobe light is observable from any angle in a horizontal plane that includes the strobe light during daylight hours and at night from a distance of at least 200 yards; and a microprocessor programmed to query the sensor and determine, based on electrical signals received from the sensor, whether or not the fluid level within the tank has dropped below a predetermined minimum level, query the battery and determine, based on electrical signals received from the battery, whether the battery has reached a preset low power threshold, and send signals to the strobe light to flash in either a double-pulse mode or a single-pulse mode when it is determined that the fluid level within the tank has dropped below the predetermined minimum level, the double-pulse mode being utilized when it is determined that the battery has not reached the preset low power threshold and the single pulse-mode being utilized when it is determined that the battery has reached the preset low power threshold, said flashing of the strobe light continuing until the tank is refilled such that the fluid level is not below the predetermined minimum level or the life of the battery is completely exhausted.

2. The device according to claim 1 wherein the microprocessor, battery and strobe light are hardwired to a circuit board, and the battery is mounted to the circuit board.

3. The device according to claim 2 wherein the circuit board is mounted to the housing and is covered by the lens.

4. The device according to claim 3 wherein the microprocessor is electrically connected to the sensor using a cable that extends from the circuit board through a gap formed by a bulge in the lens and a channel in the housing.

5. The device according to claim 1 wherein the device is mounted to a lifting lug of the tank.

6. The device according to claim 1 wherein the strobe light is a high-intensity LED type strobe light.

7. The device according to claim 1 wherein the predetermined minimum level is about 20% of the fill capacity of the tank.

8. The device according to claim 1 wherein the microprocessor is programmed to query the sensor every 10 to 15 seconds.

9. A method for monitoring a fluid level within a tank equipped with a sensor that provides electrical signals indicative of whether or not the fluid level within the tank has dropped below a predetermined minimum level, the method comprising:

providing a device comprising:
a housing;
a battery;
a microprocessor;
a strobe light; and
a lens that cooperates with the housing to encase at least the strobe light;

verifying that the battery is sufficiently charged to allow the device to be placed into service;

mounting the device to the tank such that a top of the lens is above a top of the tank thereby allowing light emitted from the strobe light to be observable from any angle in a horizontal plane that includes the strobe light during daylight hours and at night from a distance of at least 200 yards;

connecting a cable extending from the microprocessor to the sensor; and activating the device such that the microprocessor:

queries the sensor and determines, based on electrical signals received from the sensor, whether or not the fluid level within the tank has dropped below a predetermined minimum level, queries the battery and determines, based on electrical signals received from the battery, whether the battery has reached a preset low power threshold, and sends signals to the strobe light to flash in either a double-pulse mode or a single-pulse mode when it is determined that the fluid level within the tank has dropped below the predetermined minimum level, the double-pulse mode being utilized when it is determined that the battery has not reached the preset low power threshold and the single pulse-mode being utilized when it is determined that the battery has reached the preset low power threshold, said flashing of the strobe light continuing until the tank is refilled such that the fluid level is not below the predetermined minimum level or the life of the battery is completely exhausted.

10. The method according to claim 9 further comprising refilling the tank with a fluid subsequent to a time when the strobe light begins flashing.

11. The method according to claim 10 further comprising replacing the device at or about the same time as the tank is refilled.

* * * * *